US006711990B1

United States Patent
Harrison

(10) Patent No.: US 6,711,990 B1
(45) Date of Patent: Mar. 30, 2004

(54) BABY FORMULA PREPARATION AND MULTIPLE DISPENSING APPARATUS

(76) Inventor: Conrad W. Harrison, 451 Fulton Ave., Apt. #616, Hempstead, NY (US) 11550

( * ) Notice: Subject to any disclaimer, the term of this patent is extended or adjusted under 35 U.S.C. 154(b) by 0 days.

(21) Appl. No.: 10/445,337

(22) Filed: May 27, 2003

(51) Int. Cl.[7] .............. A23L 1/00; A47J 27/00; A47J 43/27; B01F 9/00; F24H 1/18
(52) U.S. Cl. ............... 99/348; 99/483; 222/146.5; 222/129.4; 366/205; 366/314
(58) Field of Search .................. 99/326–331, 332, 99/348, 352–355, 452, 453, 467–470, 483; 141/100, 99, 69; 219/386, 689, 710; 222/146.1, 146.5, 146.2, 129, 166.1, 129.4, 392/442, 451, 446; 366/144–146, 279, 314, 205; 426/465, 517, 658, 523; 606/236; 215/11.1, 11.4

(56) References Cited

U.S. PATENT DOCUMENTS

| | | | | |
|---|---|---|---|---|
| 4,694,740 A | * | 9/1987 | Daloz | 366/146 X |
| 5,315,084 A | * | 5/1994 | Jensen | 219/689 |
| 5,397,031 A | * | 3/1995 | Jensen | 222/146.5 |
| 5,419,445 A | * | 5/1995 | Kaesemeyer | 206/220 X |
| 5,427,811 A | * | 6/1995 | Fuisz et al. | 99/483 X |
| 5,445,195 A | * | 8/1995 | Kim | 141/104 |
| 5,494,193 A | * | 2/1996 | Kirschner et al. | 222/145.6 |
| 5,499,745 A | * | 3/1996 | Derian et al. | 222/145.6 |
| 5,529,212 A | * | 6/1996 | Terhardt | 222/145.6 X |
| 5,570,816 A | * | 11/1996 | LaBarbera, Jr. | 99/470 X |
| 5,589,394 A | * | 12/1996 | Kim et al. | 366/145 X |
| 5,671,325 A | * | 9/1997 | Roberson | 392/442 |
| 5,694,115 A | | 12/1997 | Desatoff | |
| 5,720,552 A | * | 2/1998 | Schindlegger | 366/314 X |
| 5,797,313 A | | 8/1998 | Rothley | |
| 6,173,117 B1 | | 1/2001 | Clubb | |
| 6,253,028 B1 | | 6/2001 | Roberson | |

* cited by examiner

*Primary Examiner*—Timothy F. Simone

(57) ABSTRACT

Baby formula preparation and multiple dispensing apparatus includes a base housing having side and bottom walls, and also having an open top, and further having container assembly support members disposed therein; and also includes a container assembly including a container, and also including a hood being securely and conventionally attached about the container, and further including a bottle support member being securely and conventionally attached to the container, and also including bottle retaining members being securely and conventionally attached to the bottle support member; and further includes a cover being removably disposed over the open top of the container; and also includes a light-emitting assembly being securely fastened attached to the container assembly; and further includes a baby formula preparation and dispensing assembly for preparing baby formula and for dispensing the baby formula to bottles.

13 Claims, 3 Drawing Sheets

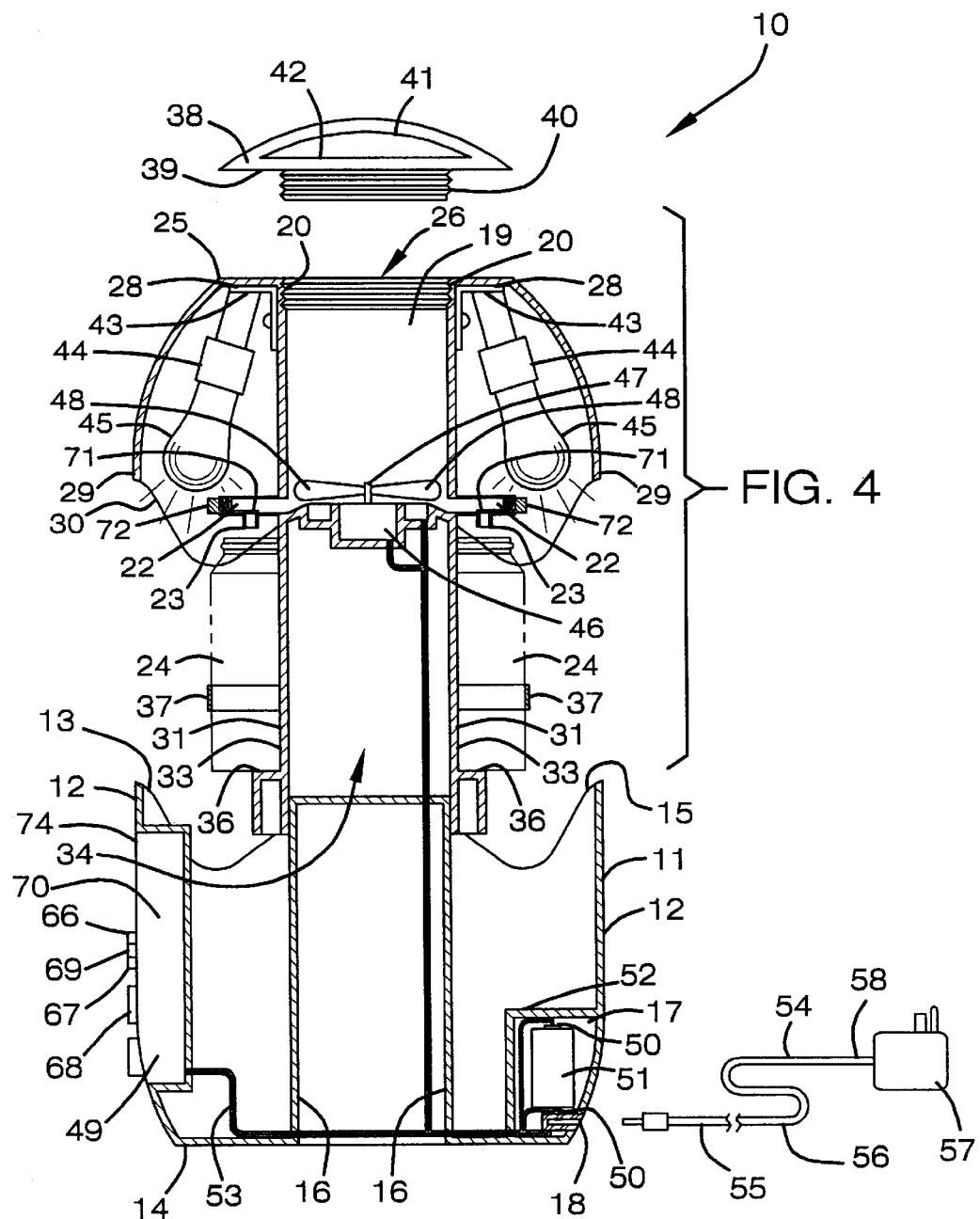

BABY FORMULA PREPARATION AND MULTIPLE DISPENSING APPARATUS

BACKGROUND OF THE INVENTION

1. Field of the Invention

The present invention relates to baby formula preparation and multiple dispensers and more particularly pertains to a new baby formula preparation and multiple dispensing apparatus for providing a device that would mix the powder and water together and dispense the mixture into a waiting bottle.

2. Description of the Prior Art

The use of baby formula preparation and multiple dispensers is known in the prior art. More specifically, baby formula preparation and multiple dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,797,313; U.S. Pat. No. 6,173,117; U.S. Pat. No. 5,397,031; U.S. Pat. No. 6,253,028; U.S. Pat. No. 5,570,816; and U.S. Pat. No. 5,694,115.

While these devices fulfill their respective, particular objectives and requirements, the aforementioned patents do not disclose a new baby formula preparation and multiple dispensing apparatus. The prior art includes an assortment of devices that prepare, filter, and or store baby formula.

SUMMARY OF THE INVENTION

The general purpose of the present invention, which will be described subsequently in greater detail, is to provide a new baby formula preparation and multiple dispensing apparatus which has many of the advantages of the baby formula preparation and multiple dispensers mentioned heretofore and many novel features that result in a new baby formula preparation and multiple dispensing apparatus which is not anticipated, rendered obvious, suggested, or even implied by any of the prior art baby formula preparation and multiple dispensers, either alone or in any combination thereof. The present invention includes a base housing having side and bottom walls, and also having an open top, and further having container assembly support members disposed therein; and also includes a container assembly including a container, and also including a hood being securely and conventionally attached about the container, and further including a bottle support member being securely and conventionally attached to the container, and also including bottle retaining members being securely and conventionally attached to the bottle support member; and further includes a cover being removably disposed over the open top of the container; and also includes a light-emitting assembly being securely fastened attached to the container assembly; and further includes a baby formula preparation and dispensing assembly for preparing baby formula and for dispensing the baby formula to bottles. None of the prior art includes the combination of the elements of the present invention.

There has thus been outlined, rather broadly, the more important features of the baby formula preparation and multiple dispensing apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new baby formula preparation and multiple dispensing apparatus which has many of the advantages of the baby formula preparation and multiple dispensers mentioned heretofore and many novel features that result in a new baby formula preparation and multiple dispensing apparatus which is not anticipated, rendered obvious, suggested, or even implied by any of the prior art baby formula preparation and multiple dispensers, either alone or in any combination thereof.

Still another object of the present invention is to provide a new baby formula preparation and multiple dispensing apparatus for providing a device that would mix the powder and water together and dispense the mixture into a waiting bottle.

Still yet another object of the present invention is to provide a new baby formula preparation and multiple dispensing apparatus that would eliminate the mess, hassle, and potential for error from the daily task of preparing bottles.

Even still another object of the present invention is to provide a new baby formula preparation and multiple dispensing apparatus that could be activated with the remote control.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a longitudinal cross-sectional view of the present invention.

DESCRIPTION OF THE PREFERRED EMBODIMENT

Figure 2:
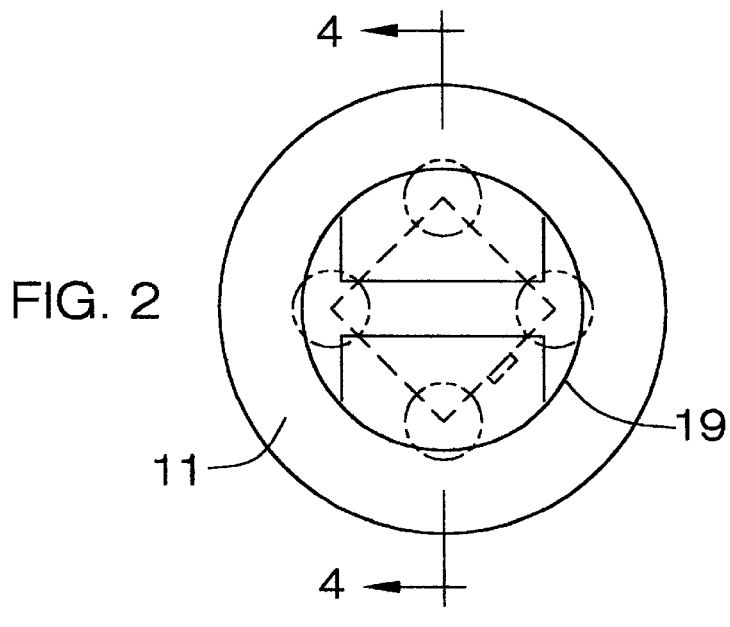
FIG. 2 is a bottom plan view of the container assembly of the present invention.
Figure 1:
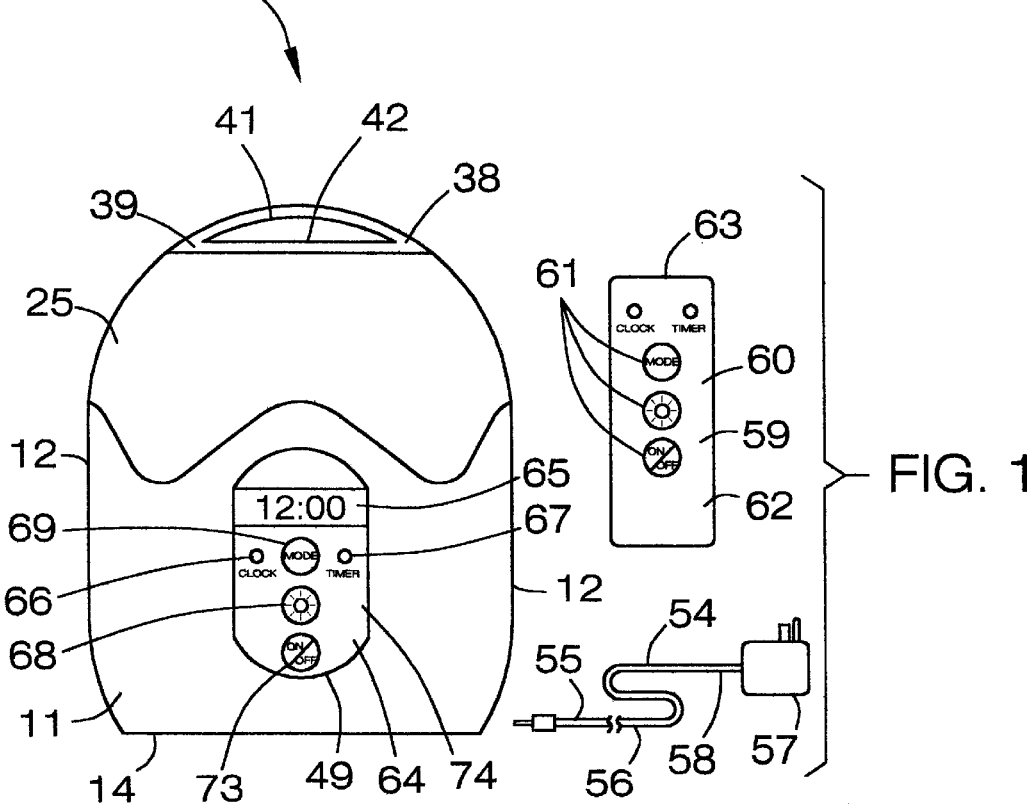
FIG. 1 is a side elevational view of a new baby formula preparation and multiple dispensing apparatus according to the present invention.
Figure 3:
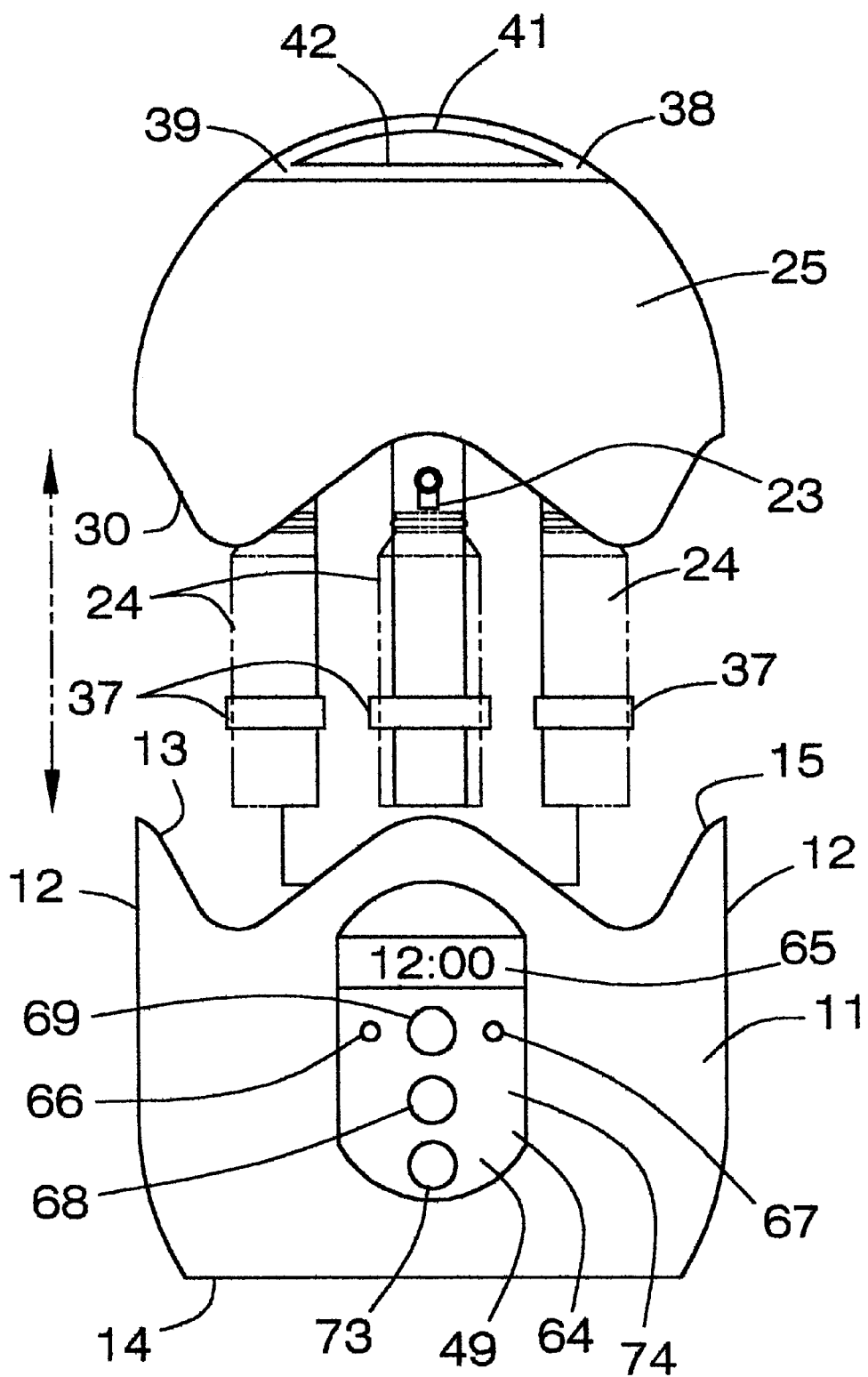
FIG. 3 is an exploded side elevational view of the present invention.

With reference now to the drawings, and in particular to FIGS. 1 through 4 thereof, a new baby formula preparation and multiple dispensing apparatus embodying the principles and concepts of the present invention and generally designated by the reference numeral 10 will be described.

As best illustrated in FIGS. 1 through 4, the baby formula preparation and multiple dispensing apparatus 10 generally comprises a base housing 11 having side and bottom walls 12,14, and also having an open top 15, and further having container assembly support members 16 being conventionally disposed therein. The container assembly support members 16 are conventionally disposed upon and extend upwardly from the bottom wall 14 of the base housing 11. The base housing 11 further has a battery compartment 17 being conventionally disposed therein and also has a jack 18 being conventionally disposed through the side wall 12 of the base housing 11 and into the battery compartment 17. The side wall 12 of the base housing 11 has a sinusoidal top edge 13. The container assembly includes a container 19, and also includes a hood 25 being securely and conventionally attached about the container 19, and further includes a bottle support member 31 being securely and conventionally fastened and attached to the container 19, and also includes bottle retaining members 37 being securely and conventionally attached to the bottle support member 31. The container 19 includes side and bottom walls 20,21, and also includes spouts 22 being conventionally and spacedly disposed in the side wall 21 of the container 19 and at the bottom wall 21 of the container 19 for dispensing prepared baby formula from the container 19, and further includes nozzles 23 being securely and conventionally attached to the spouts 22 and depending therefrom and through which the prepared baby formula is dispensed into the bottles 24. The hood 25 has an annular wall which is conventionally attached to an exterior of the side wall 20 of the container 19 and at the open top 26 of the container 19. The annular wall has a planer upper portion 28 which is disposed outwardly generally perpendicular from the side wall 20 of the container 19, and also has a lower portion 29 which is curved downwardly from the planar upper portion 28 and which is spaced along the side wall 20 of the container 19 and which has a sinusoidal bottom edge 30 to facilitate the holding of the container assembly upon the base housing 11. The bottle support member 31 includes a tubular extension member 31 depending from the bottom wall 21 of the container 19 and having a side wall 33, an open bottom 34, and a bore being disposed therein, and also includes an annular stepped platform 36 being securely and conventionally attached to an exterior of the side wall and at the open bottom 34 of the tubular extension member 31 for supporting the bottles 24 thereupon. The container assembly support members 16 of the container 19 are removably received in the bore 34 of the tubular extension member 31 to stabilize and support the container assembly upon the base housing 11. The bottle retaining members 37 are straps which are conventionally and spacedly attached to the exterior of the side wall 33 of the tubular extension member 31 and are extendable about the bottles 24 supported upon the annular stepped platform 36.

The cover 38 is removably disposed over the open top 26 of the container 19. The cover 38 includes a main wall 39, and also includes an externally-threaded boss member 40 depending from a bottom of the main wall 39 and being removably threaded in the container 19 through the open top 26 of the container 19, and further includes a handle 41 being securely and conventionally attached to a top 42 of the main wall 39.

The light-emitting assembly is attached and fastened with fasteners to the container assembly. The light-emitting assembly includes brackets 43 being securely fastened to the exterior of the side wall 20 of the container 19 below the planar upper portion 28 of the hood 25, and also includes light sockets 44 being securely fastened and attached to the brackets 43, and further includes light-emitting members 45 being removably attached to the light sockets 44 for illuminating the dispensing of the prepared baby formula from the spouts 22.

The baby formula preparation and dispensing assembly for preparing baby formula for the dispensing of the baby formula to bottles 24 includes a motor 46 being conventionally disposed in the tubular extension member 31 and being securely and conventionally attached to the bottom wall 21 of the container 19, and also includes a rotatable shaft 47 being securely and conventionally attached to the motor 46 and being extended through the bottom wall 21 of the container 19, and further includes mixing vanes 48 being securely and conventionally attached to the rotatable shaft 47 and being disposed in the container 19 for mixing the baby formula being stored in the container 19, and further includes a control panel 49 being conventionally disposed in the side wall 12 of the base housing 11 and has electrical circuitry for energizing the light-emitting members 45 and the motor 46, and also includes battery contact members 50 being conventionally disposed in the jack 18, and further includes a battery 51 being removably disposed in the battery compartment 52 of the base housing 11 for energizing the light-emitting members 45 and the motor 46, and also includes wires 53 being conventionally connected to the control panel 49 and to the battery contact members 50 and to the light-emitting members 45 and to the motor 46, and further includes a power cord 54 having an adapter plug 55 being securely and conventionally attached to a first end 56 thereof and being removably received in the jack 18 of the base housing 11, and also has an electrical outlet plug 57 being securely and conventionally attached to a second end 58 thereof, and also includes a remote control unit 59 having a housing member 60, and also has control switches 61 being disposed in a front wall 62 of the housing member 60, and further has a transmitter 63 being disposed in the housing member 60 for transmitting radio waves to the control panel 49, and further includes valve assemblies being conventionally disposed in the spouts 22 for controlling the dispensing of the prepared baby formula to the bottles 24. The control panel 49 includes a clock having a digital display screen 65 being disposed in a front wall 74 of the control panel 49, and also includes a clock adjustment switch 66 being disposed in the front wall 74 of the control panel 49, and further includes a timer switch 67 being conventionally disposed in the front wall 74 of the control panel 60, and also includes a light switch 68 being conventionally disposed in the front wall 74 of the control panel 60, and further includes a selector switch 69 being conventionally disposed in the front wall 74 of the control panel 60, and also includes a receiver 70 being conventionally disposed in the control panel 60 for receiving radio waves from the remote control unit 59, and further includes an on/off switch 73 being conventionally disposed in the control panel 60 for energizing the motor 46 and the light-emitting members 45. Each of the valve assemblies include a valve member 71 being removably and conventionally disposed over an opening into a respective nozzle 23, and also includes a valve actuator 72 being securely and conventionally attached to the valve member 71 and being movably disposed in a respective spout 22. Each of the valve actuators 72 is a button being movably disposed in an end of a respective spout 22.

In use, one would set the baby formula preparation and multiple dispensing apparatus 10 to fill the bottles 24 at a specific time using the timer switch 67 on the control panel 40 on the base housing 11. If one did not use the timer switch 67 to set the timer on the control panel 40 prior to the time needed, one could use the remote control unit 59 to begin the process of filling the bottles 24 with baby formula by pushing the control switches 61 of the control panel 64 and the buttons 72 of the valve assemblies which opens the nozzles 23 to dispense mixed baby formula contained in the container 19 through the spouts 22 and into the bottles 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the baby formula preparation and multiple dispensing apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby formula preparation and multiple dispensing apparatus comprising:
   a base housing having side and bottom walls, and also having an open top, and further having container assembly support members disposed therein;
   a container assembly including a container, and also including a hood being attached about said container, and further including a bottle support member being attached to said container, and also including bottle retaining members being attached to said bottle support member;
   a cover being removably disposed over said open top of said container;
   a light-emitting assembly being attached to said container assembly; and
   a baby formula preparation and dispensing assembly for preparing baby formula and for dispensing the baby formula to bottles.

2. The baby formula preparation and multiple dispensing apparatus as described in claim 1, wherein said container assembly support members are disposed upon and extend upwardly from said bottom wall of said base housing; said base housing further having a battery compartment being disposed therein and also having a jack being disposed through said side wall of said base housing and into said battery compartment, said side wall of said base housing having a sinusoidal top edge.

3. The baby formula preparation and multiple dispensing apparatus as described in claim 2, wherein said container includes side and bottom walls, and also includes spouts being spacedly disposed in said side wall of said container and at said bottom wall of said container for dispensing prepared baby formula from said container, and further includes nozzles being attached to said spouts and depending therefrom and through which the prepared baby formula is dispensed into the bottles.

4. The baby formula preparation and multiple dispensing apparatus as described in claim 3, wherein said hood has an annular wall which is attached to an exterior of said side wall of said container and at said open top of said container; said annular wall having a planer upper portion which is disposed outwardly generally perpendicular from said side wall of said container, and also having a lower portion which is curved downwardly from said planar upper portion and which is spaced along said side wall of said container and which has a sinusoidal bottom edge to facilitate the holding of said container assembly upon said base housing.

5. The baby formula preparation and multiple dispensing apparatus as described in claim 4, wherein said bottle support member includes a tubular extension member depending from said bottom wall of said container and having a side wall, an open bottom, and a bore being disposed therein, and also includes an annular stepped platform being attached to an exterior of said side wall and at said open bottom of said tubular extension member for supporting the bottles thereupon, said container assembly support members of said container being removably received in said bore of said tubular extension member to stabilize and support said container assembly upon said base housing.

6. The baby formula preparation and multiple dispensing apparatus as described in claim 5, wherein said bottle retaining members are straps which are spacedly attached to the exterior of said side wall of said tubular extension member and being extendable about the bottles supported upon said annular stepped platform.

7. The baby formula preparation and multiple dispensing apparatus as described in claim 4, wherein said light-emitting assembly includes brackets being fastened to the exterior of said side wall of said container below said planar upper portion of said hood, and also includes light sockets being attached to said brackets, and further includes light-emitting members being removably attached to said light sockets for illuminating the dispensing of the prepared baby formula from said spouts.

8. The baby formula preparation and multiple dispensing apparatus as described in claim 7, wherein said baby formula preparation and dispensing assembly includes a motor being disposed in said tubular extension member and being attached to said bottom wall of said container, and also includes a rotatable shaft being attached to said motor and being extended through said bottom wall of said container; and further includes mixing vanes being attached to said rotatable shaft and being disposed in said container for mixing the baby formula being stored in said container; and further includes a control panel being disposed in said side wall of said base housing and having electrical circuitry for energizing said light-emitting members and said motor; and also includes battery contact members being disposed in said jack and in said battery compartment; and further includes a battery being removably disposed in said battery compartment of said base housing for energizing said light-emitting members and said motor; and also includes wires being connected to said control panel and to said battery contact members and to said light-emitting members and to said motor; and further includes a power cord having an adapter plug being attached to a first end thereof and being removably received in said jack of said base housing, and also having an electrical outlet adapter plug being attached to a second end thereof; and also includes a remote control unit having a housing member, and also having control switches being disposed in a front wall of said housing member, and further having a transmitter disposed in said housing member for transmitting radio waves to said control panel; and further includes valve assemblies being disposed in said spouts for controlling the dispensing of the prepared baby formula to the bottles.

9. The baby formula preparation and multiple dispensing apparatus as described in claim 8, wherein said control panel includes a clock having a digital display screen being disposed in a front wall of said control panel, and also includes a clock adjustment switch being disposed in said front wall of said control panel, and further includes a timer switch being disposed in said front wall of said control panel for automatically dispensing the baby formula into the bottles for a selected period of time, and also includes a light switch being disposed in said front wall of said control panel for energizing said light-emitting members, and further includes a selector switch being disposed in said front wall of said control panel, and also includes a receiver being disposed in said control panel for receiving radio waves from said remote control unit, and further includes an on/off switch being disposed in said control panel for energizing said motor and said light-emitting members.

10. The baby formula preparation and multiple dispensing apparatus as described in claim 8, wherein each of said valve assemblies includes a valve member being removably disposed over an opening into a respective said nozzle, and also includes a valve actuator being attached to said valve member and being movably disposed in a respective said spout for moving said valve member.

11. The baby formula preparation and multiple dispensing apparatus as described in claim 10, wherein each of said valve actuators is a button being movably disposed in an end of a respective said spout.

12. The baby formula preparation and multiple dispensing apparatus as described in claim 3, wherein said cover includes a main wall, and also includes an externally-threaded boss member depending from a bottom of said main wall and being removably threaded in said container through said open top of said container, and further includes a handle being attached to a top of said main wall.

13. A baby formula preparation and multiple dispensing apparatus comprising:

a base housing having side and bottom walls, and also having an open top, and further having container assembly support members disposed therein, said container assembly support members being disposed upon and extend upwardly from said bottom wall of said base housing, said base housing further having a battery compartment being disposed therein and also having a jack being disposed through said side wall of said base housing and into said battery compartment, said side wall of said base housing having a sinusoidal top edge;

a container assembly including a container, and also including a hood being attached about said container, and further including a bottle support member being attached to said container, and also including bottle retaining members being attached to said bottle support member, said container including side and bottom walls, and also including spouts being spacedly disposed in said side wall of said container-and at said bottom wall of said container for dispensing prepared baby formula from said container, and further including nozzles being attached to said spouts and depending therefrom and through which the prepared baby formula is dispensed into the bottles, said hood having an annular wall which is attached to an exterior of said side wall of said container and at said open top of said container, said annular wall having a planer upper portion which is disposed outwardly generally perpendicular from said side wall of said container, and also having a lower portion which is curved downwardly from said planar upper portion and which is spaced along said side wall of said container and which has a sinusoidal bottom edge to facilitate the holding of said container assembly upon said base housing, said bottle support member including a tubular extension member depending from said bottom wall of said container and having a side wall, an open bottom, and a bore being disposed therein, and also including an annular stepped platform being attached to an exterior of said side wall and at said open bottom of said tubular extension member for supporting the bottles thereupon, said container assembly support members of said container being removably received in said bore of said tubular extension member to stabilize and support said container assembly upon said base housing, said bottle retaining members being straps which are spacedly attached to the exterior of said side wall of said tubular extension member and being extendable about the bottles supported upon said annular stepped platform;

a cover being removably disposed over said open top of said container, said cover including a main wall, and also including an externally-threaded boss member depending from a bottom of said main wall and being removably threaded in said container through said open top of said container, and further including a handle being attached to a top of said main wall;

a light-emitting assembly being attached to said container assembly, said light-emitting assembly including brackets being fastened to the exterior of said side wall of said container below said planar upper portion of said hood, and also including light sockets being attached to said brackets, and further including light-emitting members being removably attached to said light sockets for illuminating the dispensing of the prepared baby formula from said spouts; and a baby formula preparation and dispensing assembly for preparing baby formula and for dispensing the baby formula to bottles, said baby formula preparation and dispensing assembly including a motor being disposed in said tubular extension member and being attached to said bottom wall of said container, and also including a rotatable shaft being attached to said motor and being extended through said bottom wall of said container, and further including mixing vanes being attached to said rotatable shaft and being disposed in said container for mixing the baby formula being stored in said container, and further including a control panel being disposed in said side wall of said base housing and having electrical circuitry for energizing said light-emitting members and said motor, and also including battery contact members being disposed in said jack, and further including a battery being removably disposed in said battery compartment of said base housing for energizing said light-emitting members and said motor, and also including wires being connected to said control panel and to said battery contact members and to said light-emitting members and to said motor, and further including a power cord having an adapter plug being attached to a first end thereof and being removably received in said jack of said base housing, and also having an electrical outlet plug being attached to a second end thereof, and also including a remote control unit having a housing member, and also having control switches being disposed in a front wall of said housing member, and further having a transmitter disposed in said housing member for transmitting radio waves to said control panel, and further including valve assemblies being disposed in said spouts for controlling the dispensing of the prepared baby formula to the bottles, said control panel including a clock having a digital display screen being disposed in a front wall of said control panel, and also including a clock adjustment switch being disposed in said front wall of said control panel, and further including a timer switch being disposed in said front wall of said control panel, and also including a light switch being disposed in said front wall of said control panel, and further including a selector switch being disposed in said front wall of said control panel, and also including a receiver being disposed in said control panel for receiving radio waves from said remote control unit, each of said valve assemblies including a valve member being removably disposed over an opening into a respective said nozzle, and also including a valve actuator being attached to said valve member and being movably disposed in a respective said spout, each of said valve actuators being a button being movably disposed in an end of a respective said spout.

\* \* \* \* \*